2,826,608
PRODUCTION OF 2-HYDROXY AND 2-KETO GLUTARIC ACID AND ALKYL DERIVATIVES THEREOF

Jack J. Bulloff, Dayton, Ohio, assignor to The Commonwealth Engineering Company of Ohio, Dayton, Ohio, a corporation of Ohio No Drawing. Application October 7, 1954
Serial No. 461,030

5 Claims. (Cl. 260—533)

This invention relates to improved methods for the production of 2-hydroxy and 2-keto glutaric acid and alkylated derivatives thereof.

A primary object of the invention is to provide a method for producing the acids from readily available, abundant and inexpensive starting materials by simple synthesis not involving biological materials or steps.

In accordance with the invention, 2-hydroxy glutaric acid is produced from the abundant, inexpensive petrochemical, cyclopentadiene, by treating the diene with hydrogen chloride gas at a temperature of −35° C. to −25° C. to convert it to 2-chlorocyclopentene-1, oxidizing the latter to 2-chloroglutaric acid in aqueous medium, e. g., by treatment with an aqueous solution of an oxidizing agent such as nitric acid, and hydrolyzing the 2-chloroglutaric acid to 2-hydroxy glutaric acid. The latter may be recovered from the aqueous solution by drying and used as such or oxidized to 2-ketoglutaric acid in aqueous solution, e. g., by treatment with an aqueous solution of the oxidizing agent. Instead of oxidizing the 2-chlorocyclopentene-1, to 2-chloroglutaric acid and hydrolyzing the latter to the 2-hydroxy acid, the 2-chloroglutaric acid may be oxidized directly to the 2-ketoglutaric acid.

Oxidizing agents which may be used in carrying out the process include, in addition to 30% nitric acid, such known oxidizing agents as perrhenates, vanadates, chromates, ferrates or periodates.

Similar reactions are involved in the production of the 4-monoalkyl and 4,4-dialkyl derivatives of the 2-hydroxy and 2-keto glutaric acids from the correspondingly alkylated cyclopentadienes.

The following examples are illustrative of the invention, it being understood that these examples are not intended to be limitative.

Example I

Hydrogen chloride is bubbled through 650 lbs. of anhydrous cyclopentadiene at a temperature of −25° C. The 1000 lbs. of 2-chlorocyclopentene-1 thus obtained are heated with 5670 lbs. of 30% nitric acid at 30° C. to obtain 5080 lbs. of 30% 2-chloroglutaric acid solution. The solution is heated for two hours at 50° C., at the end of which time the chloro-acid is completely hydrolyzed to 2-hydroxy glutaric acid which may be recovered by drying the solution. The nitric oxide (540 lbs.) given off during the oxidation step is collected and converted to nitric acid for use in the oxidation of further quantities of 2-chloroglutaric acid. Hydrochloric acid present in the hydrolysis solution may be removed as the silver salt which may be regenerated for re-use.

Example II

The 30% solution of 2-chlorocyclopentene-1 of Example I is heated at 50° C. for two hours with 6510 lbs. of 30% nitric acid to obtain, directly, a solution of 2-keto glutaric acid from which the acid may be recovered by drying.

Example III

Hydrogen chloride at −25° C. is passed into 650 lbs. of anhydrous 4-methyl cyclopentadiene. The 1000 lbs. of 2-chloro-4-methylcyclopentene-1 thus obtained is heated with 5670 lbs. of 30% nitric acid at 30° C. for two hours to obtain a 30% solution of 2-chloro-4-methylglutaric acid, which is heated at 50° C. for two hours to effect hydrolysis of the 2-chloro acid to 2-hydroxy-4-methyl glutaric acid which is recovered from the solution by drying.

Example IV

The solution of 2-chloro-4-methyl glutaric acid of Example III is heated at 50° C. for two hours with 6510 lbs. of 30% nitric acid to obtain, directly, a solution of 2-keto-4-methyl glutaric acid from which the acid is recovered by drying.

Example V

Hydrogen chloride, at −25° C., is passed into 650 lbs. of anhydrous 4,4-dimethyl cyclopentadiene. The 1000 lbs. of 2-chloro-4,4-dimethyl cyclopentene-1 thus obtained are heated with 5670 lbs. of 30% nitric acid for two hours at 30° C., a 30% solution of 2-chloro-4,4-dimethyl glutaric acid being thus obtained. The solution is heated at 50° C. for two hours to hydrolyze the 2-chloro-acid to 2-hydroxy-4,4-dimethyl glutaric acid which is recovered from the solution by drying.

Example VI

The 30% solution of 2-chloro-4,4-dimethylcyclopentene-1 of Example V is heated at 50° C. for 2 hours with 6510 lbs. of 30% nitric acid, whereby a solution of 2-keto-4,4-dimethyl glutaric acid is obtained. The acid is recovered from the solution by drying.

In general the hydrogen chloride passed into the cyclopentadiene intermediate (transient production of the 2-hydroxy acid), the 2-hydroxy glutaric acid in solution may be treated with the oxidizing agent or it may be recovered from the hydrolysis solution and subsequently treated with the oxidizing agent in aqueous solution.

The 2-chloroglutaric acid in solution may be hydrolyzed to 2-hydroxy glutaric acid by holding the solution at a temperature of 15° C. to 50° C. for a time varying inversely with the temperature between 4 hours and 2 hours.

Instead of 4-methylcyclopentadiene or 4,4-dimethylcyclopentadiene, there may be used other 4-alkyl and 4,4-dialkyl cyclopentadienes in which the alkyl radicals contain up to five carbons and, in the case of the dialkyl dienes, are the same or different.

The cyclopentadiene used as starting material may be obtained by depolymerization of a polymer thereof, for instance by distillation of dicyclopentadiene at a still temperature of 170° C. and collection of the monomer at a temperature of about 45° C.

Good yields of the 2-hydroxy glutaric acid and 2-keto-glutaric acid are obtained by the present process at less expense than is possible with the processes known heretofore and in a simple manner as compared to methods involving biosynthesis.

Since some changes and variations may be made in practicing the invention without departing from the spirit and scope thereof, it is to be understood that it is not intended to limit the invention except as defined in the appended claims.

What is claimed is:

1. The method for producing 2-hydroxy-glutaric acids from cyclopentadienes which comprises passing hydrogen chloride into a substance selected from the group consisting of cyclopentadiene, 4-alkyl cyclopentadiene in which the alkyl radical contains from 1 to 5 carbon atoms, and 4,4-dialkyl cyclopentadiene in which the alkyl radicals each contain from 1 to 5 carbon atoms, heating the corresponding 2-chlorocyclopentene-1, 2-chloro-4-alkyl-cyclopentene-1, and 2-chloro-4,4-dialkyl-cyclopentene-1 thus produced with 30% aqueous nitric acid for about 2 hours at about 30° C. to effect oxidation of the chlorinated cyclopentene-1 to the corresponding 2-chloro-glutaric acid, heating the resulting aqueous solution of the chlorinated glutaric acid at a temperature of about 50° C. for about 2 hours and until the chlorinated acid is hydrolyzed to the corresponding 2-hydroxy acid.

2. The method according to claim 1, characterized in that the starting material is cyclopentadiene and the acid produced as the final product is 2-hydroxy glutaric acid.

3. The method according to claim 1, characterized in that the starting material is 4-methyl-cyclopentadiene and the acid produced as the final product is 2-hydroxy-4-methyl glutaric acid.

4. The method according to claim 1, characterized in that the starting material is 4,4-dimethyl cyclopentadiene and the acid produced as the final product is 2-hydroxy-4,4-dimethyl glutaric acid.

5. The method according to claim 1, characterized in that the starting material is cyclopentadiene, the hydrogen chloride is passed into the same at a temperature of about −35° C. to −25° C., and the aqueous solution of the 2-chloro-glutaric acid is held at a temperature of 15° C. to 50° C. until the 2-chloro acid is hydrolyzed to 2-hydroxy-glutaric acid.

References Cited in the file of this patent

UNITED STATES PATENTS 2,285,601     McAllister _____ June 9, 1942

OTHER REFERENCES

Noller: Chemistry of Organic Compounds (1951), pp. 719 and 766.